Sept. 16, 1924.                                                          1,508,865
G. E. WILLIAMS
WIPER CLOTH FOR PIPE JOINTS
Filed April 23, 1923
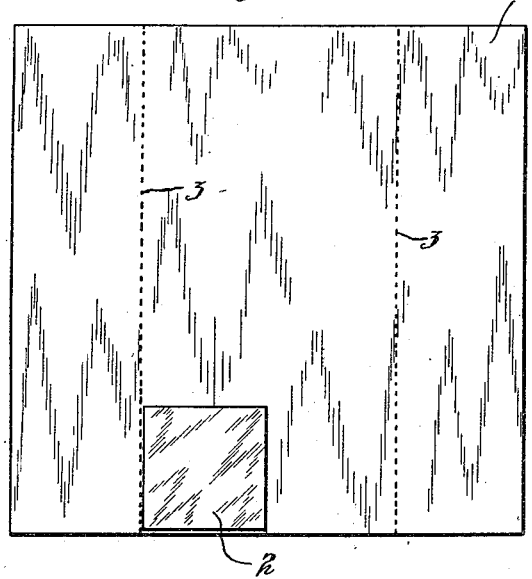
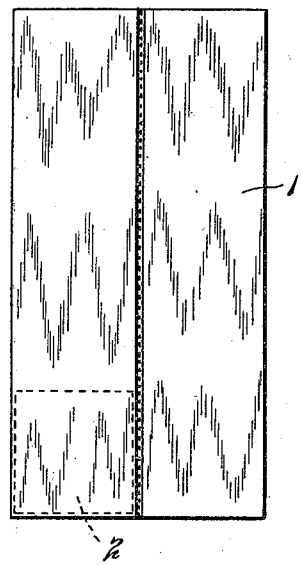
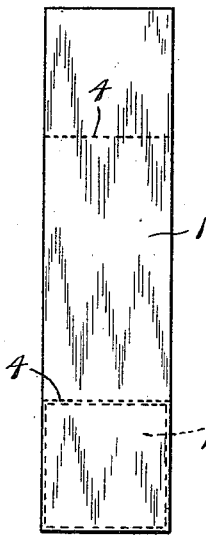
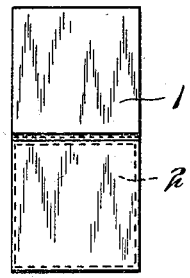
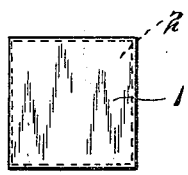
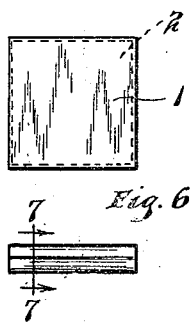
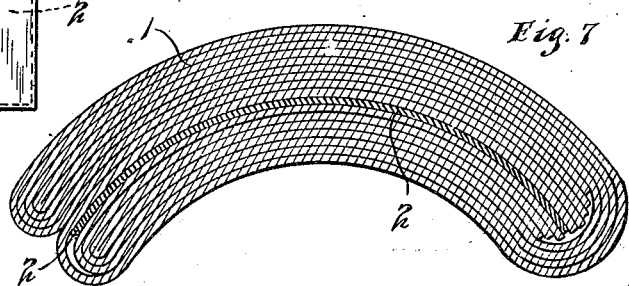
INVENTOR.
GEORGE E. WILLIAMS.
BY HIS ATTORNEY.

Patented Sept. 16, 1924.

1,508,865

UNITED STATES PATENT OFFICE.

GEORGE E. WILLIAMS, OF MINNEAPOLIS, MINNESOTA.

WIPER CLOTH FOR PIPE JOINTS.

Application filed April 23, 1923. Serial No. 634,200.

*To all whom it may concern:*

Be it known that I, GEORGE E. WILLIAMS, a citizen of the United States, residing at Minneapolis, in the county of Hennepin and State of Minnesota, have invented certain new and useful Improvements in Wiper Cloths for Pipe Joints; and I do hereby declare the following to be a full, clear, and exact description of the invention, such as will enable others skilled in the art to which it appertains to make and use the same.

This invention relates to a cloth or pad, and particularly to a wiper cloth and the method of making the same, adapted to be used in wiping joints, such as are commonly used in joining the ends of lead pipes, lead and brass pipes, and lead cables, as well as in branching such pipes. In such a joining operation, the end of one of the pipe sections is tightly fitted in the flaring end of the other. Said ends are scraped or cleaned and the solder joint then placed thereover. This is done by pouring the solder over the clean surface to heat the same and for accumulating a certain portion of solder on the pipe. The solder is held and manipulated by a wiper cloth in the hands of the operator. The pipe sections must be properly heated and the accumulated solder must be wiped around the same so as to bring the solder into proper and intimate contact with the sections at all points to be covered by the joint. The solder used in making the joint is shaped or formed by the operator into semi-elliptical form, the same being thickest at the center and tapering in an even curve to the ends. It takes a considerable amount of skill and quite a little artistic ability to properly wipe and finish a joint so that the surface of the joint is smooth and the same free from lines. Preferably, only a very dim line extends lengthwise of the joint where the wiper cloth was last lifted therefrom. The operation of wiping and shaping the joint from the time the pipes are heated until the solder is so solid as to be unworkable is only about thirty seconds. Certain cloths have been used and marketed for wiping such joints, which cloths have merely constituted flat folded pieces of strong canvas-like material.

It is an object of this invention, therefore, to provide a wiper cloth comprising a folded piece of material having a plurality of plies, which cloth has been given a permanent curved shape to facilitate the wiping and the shaping of the joint to correct proportions and uniform curvature.

It is a further object of the invention to provide a wiper cloth comprising such a folded sheet having a layer of asbestos or similar material between the folds thereof adjacent the center of the folded cloth.

It is also an object of the invention to form the cloth by folding the same in a novel manner and in shaping the cloth by pressure in the presence of heat.

These and other objects and advantages of the invention will be fully set forth in the following description made in connection with the accompanying drawings in which like reference characters refer to the same parts throughout the different views, and in which, Fig. 1 is a plan view of the blank of cloth material used, together with the sheet of asbestos;

Fig. 2 is a view showing the parts after the first fold has been made;

Fig. 3 is a plan view showing the parts after the second fold has been made;

Fig. 4 is a plan view showing the parts after the third fold has been made;

Fig. 5 is a plan view showing the completely folded cloth;

Fig. 6 is a view in side elevation of the cloth showing the same in curved form; and Fig. 7 is a transverse section of the cloth such as indicated by the line 7—7 of Fig. 6, the same being on an enlarged scale and showing the cloth after it has been shaped.

Referring to the drawings, a blank or piece of cloth material 1 is provided of rectangular shape and substantially square. While any strong suitable canvas like or other cloth may be used, it has been common to make the wiper cloths of strong cloth similar to bed ticking, or of a closely woven cloth known as moleskin. The sheet 2 of asbestos is substantially square and has its side approximately one-quarter the dimension of the blank 1. The sheet 2 is placed on the blank, as shown in Fig. 1, with one of its side edges closely adjacent one edge of the blank and the adjacent side edge disposed substantially on the center line of the blank. The side edges of the blank 1 are then folded inwardly along the dotted lines 3. These lines are parallel to the side edges and located a distance therefrom equal to approximately one-quarter of the length of the side of the blank 1. After this first fold the blank is brought to a size or area substantially half of its original area. The longitudinal sides of the blank are now again folded together and the same is then in the form of a strip having a width equal to substantially one-fourth of its original width. When this latter fold is made, the half of the folded blank at the right, as seen in Fig. 2 is folded over onto the half at the left of said figure. The blank is now folded endwise, the end edges thereof being folded along the lines 4 which are parallel thereto and spaced therefrom a distance equal substantially one-fourth the length of the blank. The blank is now in the form of a folded sheet having an area of substantially one-eighth of the original area, as shown in Fig. 4. It will be noted that by the disposition of the asbestos sheet 2 the same is now in a lower half of the folded sheet as seen in Fig. 4 and immediately under the top ply thereof. The blank is now given one more endwise fold about its center portion and is then folded into a figure having an area one-sixteenth its original area and having sides with a length one-fourth the size of the original blank. After the cloths have thus been folded the same are placed between the curved surfaces of a press, which surfaces are heated by steam or other suitable heating medium. If desired, the cloths may be somewhat dampened before being placed between the heating forms of the press. After remaining in the press a certain length of time the cloths are given a permanent curved or semi-cylindrical shape, as shown in Fig. 7. As previously stated, before the final fold of the cloth the asbestos sheet 2 is immediately beneath the top layer so that, in the final folding of the cloth, this sheet is brought approximately at the center of the folded cloth.

The permanent curved shape given to the cloth adds greatly to the utility thereof and makes it much easier for the operator to properly shape the joint. The cloth is held with the convex surface next to the hand while the joint is pressed with the concave side. The permanent curve of this concave side therefore greatly assists in getting the desired curve on the joint and fewer strokes are necessary to get the desired curvature. The circumferential curvature heretofore given to the joint has been attained altogether by the operator's hand and eye and quite a number of strokes of the flat cloth were necessary for the shaping part of the operation. It, readily, will be seen, therefore, that the semi-cylindrical cloth will greatly assist the operator in shaping the joints and making the same uniform, and will reduce the time necessary for the operation. The asbestos sheet used in the cloth assists in retaining the curved form and also acts to prevent any objectionable transmission of heat from the solder to the operator's hand.

From the above description it is seen that applicant has provided a simple and efficient form of wiper cloth and one which will have a high degree of utility. The proper wiping of joints has heretofore required a high degree of skill and highly skilled operators have required long experience. With the formed wiper cloth of applicant, a much smaller degree of skill is necessary in order properly to wipe and finish the joint. The cloths are easily and inexpensively made and the same have been amply demonstrated in actual practice.

It will, of course, be understood, that various changes may be made in the form, details and proportions of the device and in the steps of the method without departing from the scope of applicant's invention, which, generally stated, consists in a device capable of carrying out the objects above enumerated and such as shown and described and set forth in the appended claims.

What is claimed is:

1. A wiper cloth for wiping joints comprising a sheet of cloth folded into a plurality of plies and having a sheet of asbestos between two plies thereof which are adjacent the center of the folded cloth, said cloth being given a permanent curve of substantially semi-cylindrical form.

2. A wiper cloth for making joints comprising a sheet of cloth folded inwardly from its edges successively to have sixteen plies, a sheet of asbestos between two of the plies thereof adjacent the center of the folded cloth, said cloth being given a permanent semi-cylindrical shape.

3. The method of making a wiper cloth for wiping joints which comprises providing a rectangular sheet of canvas-like cloth, folding the sides thereof inwardly successively to produce a folded cloth having a plurality of plies, pressing the folded cloth between heated forms to give the same a permanent semi-cylindrical shape.

4. The method of making a wiper cloth for wiping joints which comprises providing a rectangular sheet of canvas-like material, placing a rectangular sheet of asbestos thereon having one of its sides adjacent one side of a sheet of cloth and its adjacent side disposed along the center line of the sheet of cloth, folding the sides of the sheet of cloth inwardly to the center thereof, again folding the sides inwardly in superposed relation and folding the blank endwise with the end edges disposed at the center thereof and then again folding the blank endwise to bring the two ends in superposed relation and then shaping the folded cloth to substantially semi-cylindrical form.

5. The method of making a wiper cloth for wiping joints, which comprises providing a rectangular sheet of canvas material which is substantially square, placing a substantially square sheet of asbestos material thereon with one of its sides substantially alined with one end of the sheet of cloth and its adjacent side alined with the center line of the sheet of cloth, folding the sides of the sheet of cloth inwardly substantially to meet at the center line thereof, again folding the cloth substantially along the longitudinal center line thereof, then folding the cloth endwise to bring the end edges thereof substantially to the center line of the folded cloth and then folding the cloth again about the transverse center line thereof, making the cloth, when folded into square form comprising sixteen plies and having the asbestos sheet disposed between two of the plies which are adjacent the center of the folded cloth and then permanently shaping the cloth to semi-cylindrical form between heated dies.

6. A wiper cloth for wiping joints comprising a sheet of cloth folded into a plurality of plies and having a sheet of asbestos between two plies thereof, said cloth being given a permanent curve of substantially semi-cylindrical form.

7. A wiper cloth comprising a canvas-like piece of fabric of substantially rectangular shape folded successively upon itself along straight lines parallel to the edges thereof to form a multi-ply article and forming said article into the permanent shape of a segment of a substantially cylindrical surface, said cylinder having its axis extending parallel to one edge of said article.

In testimony whereof I affix my signature.

GEORGE E. WILLIAMS.